United States Patent [19]

Johnson

[11] Patent Number: 4,589,688
[45] Date of Patent: May 20, 1986

[54] PLUMBING HOOKUP KIT

[75] Inventor: Dwight N. Johnson, Vista, Calif.

[73] Assignee: Fillpro Products, Inc., Carlsbad, Calif.

[21] Appl. No.: 298,646

[22] Filed: Sep. 2, 1981

[51] Int. Cl.$^4$ .............................................. F16L 25/00
[52] U.S. Cl. ...................................... 285/12; 285/174; 285/256; 285/341; 285/347; 285/354
[58] Field of Search .................. 285/12, 175, 177, 174, 285/341, 354, 347, 256

[56] References Cited

U.S. PATENT DOCUMENTS

| 3,338,547 | 8/1967 | Mason | 285/177 X |
| 3,381,982 | 5/1968 | Elek | 285/177 X |
| 3,502,355 | 3/1970 | Demler et al. | 285/177 X |
| 3,831,983 | 8/1974 | Stickler | 285/12 |
| 4,162,092 | 7/1979 | Hayes | 285/177 X |
| 4,291,903 | 9/1981 | Fields | 285/177 X |

FOREIGN PATENT DOCUMENTS

| 1262699 | 4/1961 | France | 285/174 |
| 2007791 | 5/1979 | United Kingdom | 285/12 |

OTHER PUBLICATIONS

Wilson, Scott, The Plumber's Bible, Doubleday & Co., 1981, pp. 39-41, 63, 64 and 114-118.
Plan-O-Gram brochure; Quick & Easy Hookups, etc.
Handi Shop, Inc. brochure, Quick Hookup Water Supply Connector etc.

Primary Examiner—Dave W. Arola
Attorney, Agent, or Firm—Mason, Kolehmainen, Rathburn & Wyss

[57] ABSTRACT

A plumbing hookup kit for making water supply connections between any of numerous different fittings such as faucet shanks, toilet tank fill valve shanks, and valve, coupling and adapter compression and slip fittings in ⅜", 7/16" and ½" sizes. The kit includes a length of supply tubing with an annular terminal attached to each end, together with a seal ring adapted to encircle each terminal. With smaller fitting sizes, the seal ring and terminal effect a fluid tight connection in cooperation with the fitting and its associated coupling nut. Adaptor sleeves of different sizes and different configurations cooperate with the terminal and seal ring to effect a fluid tight seal with larger fittings and associated coupling nuts of either the compression or slip type.

17 Claims, 17 Drawing Figures

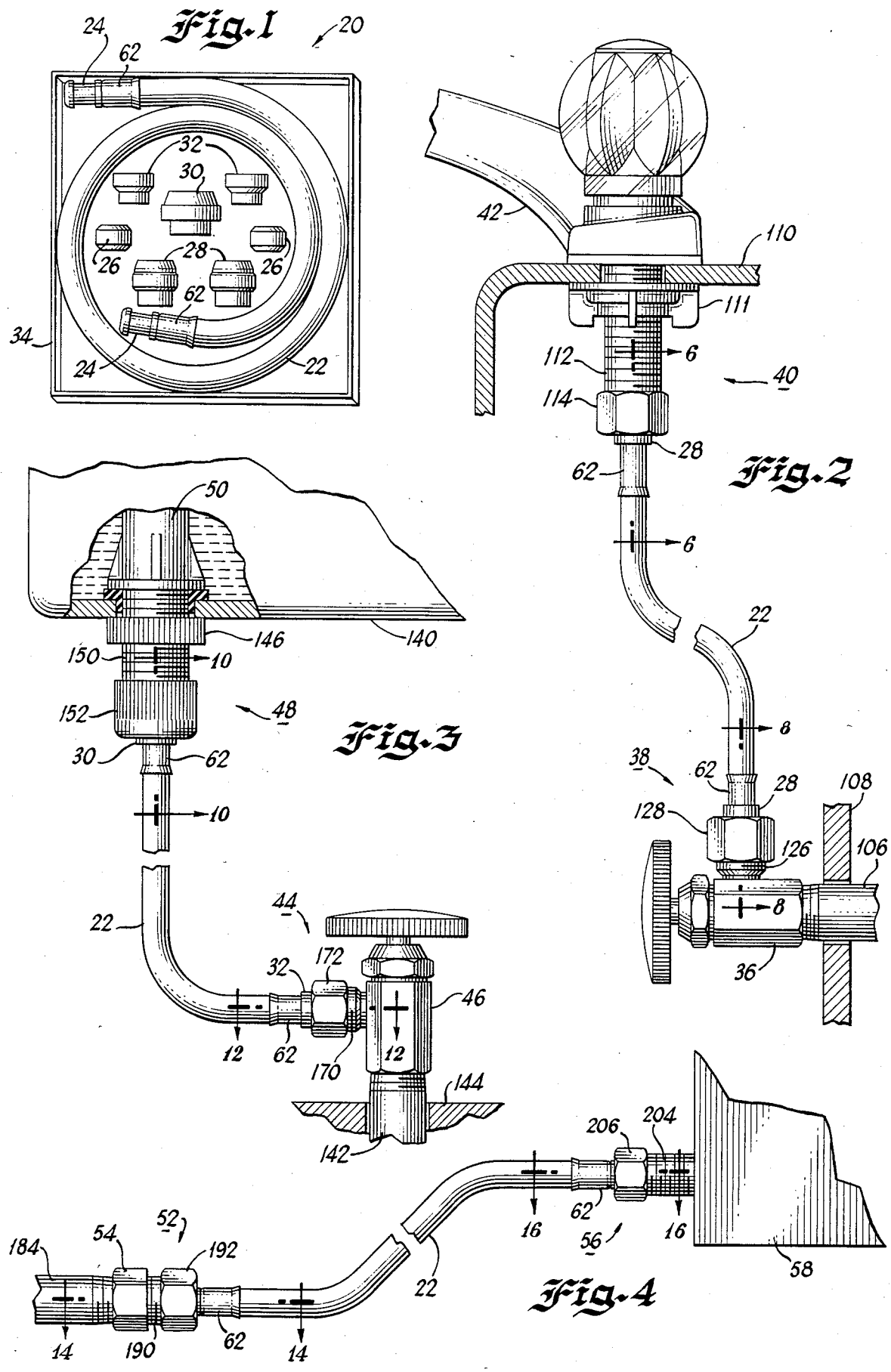

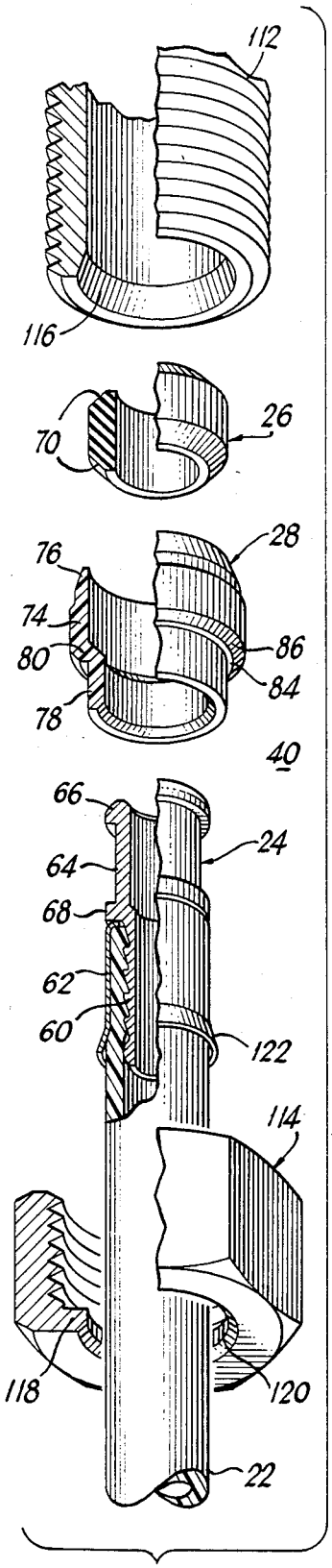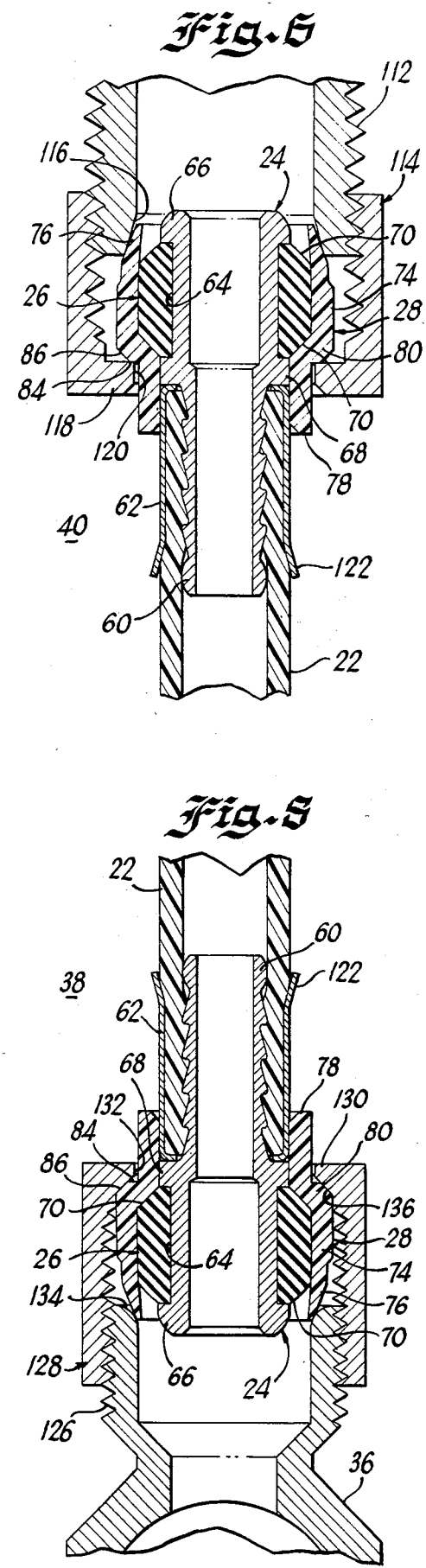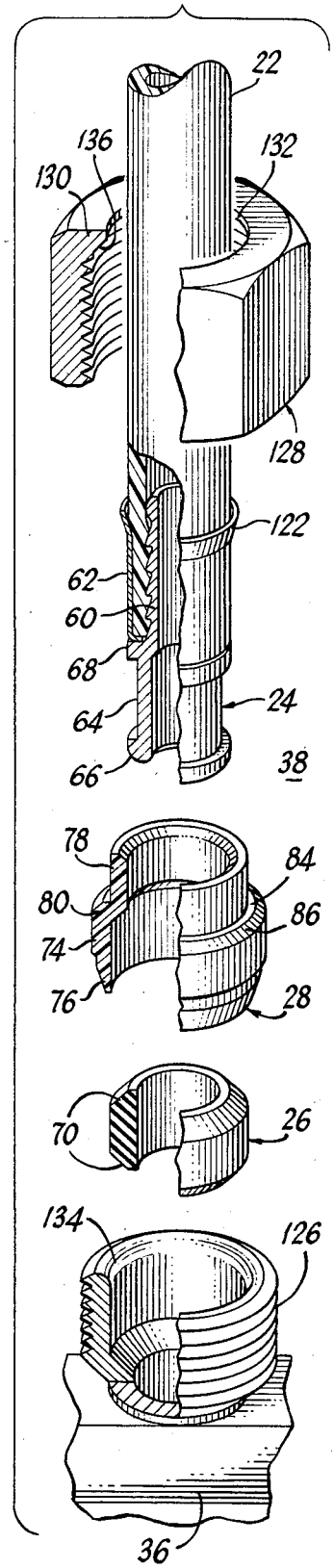

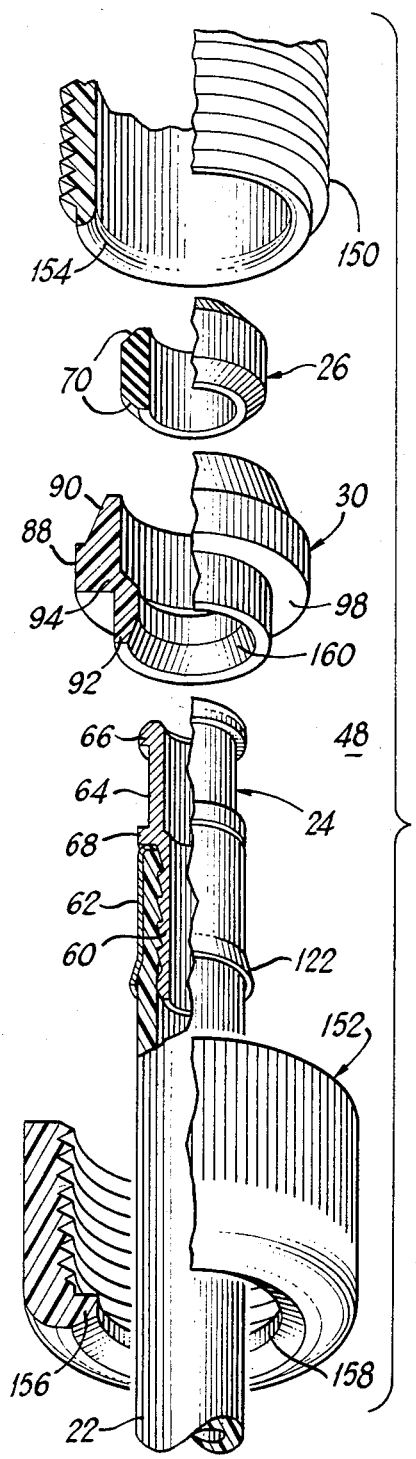

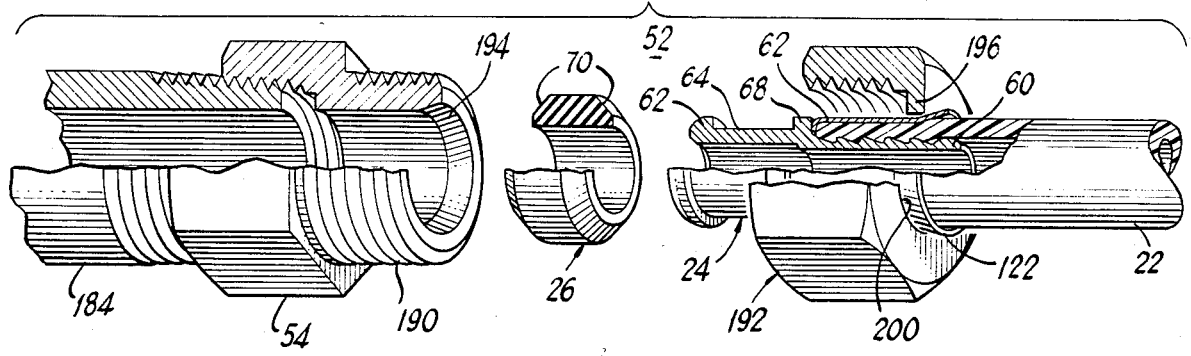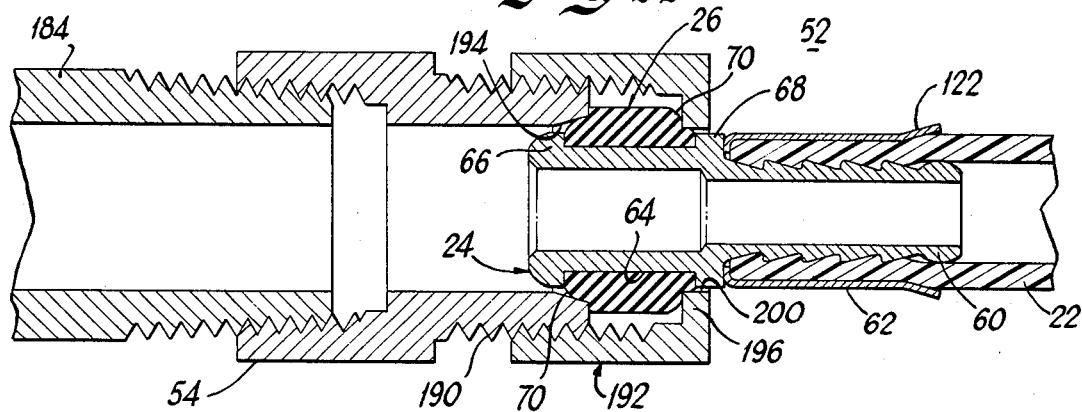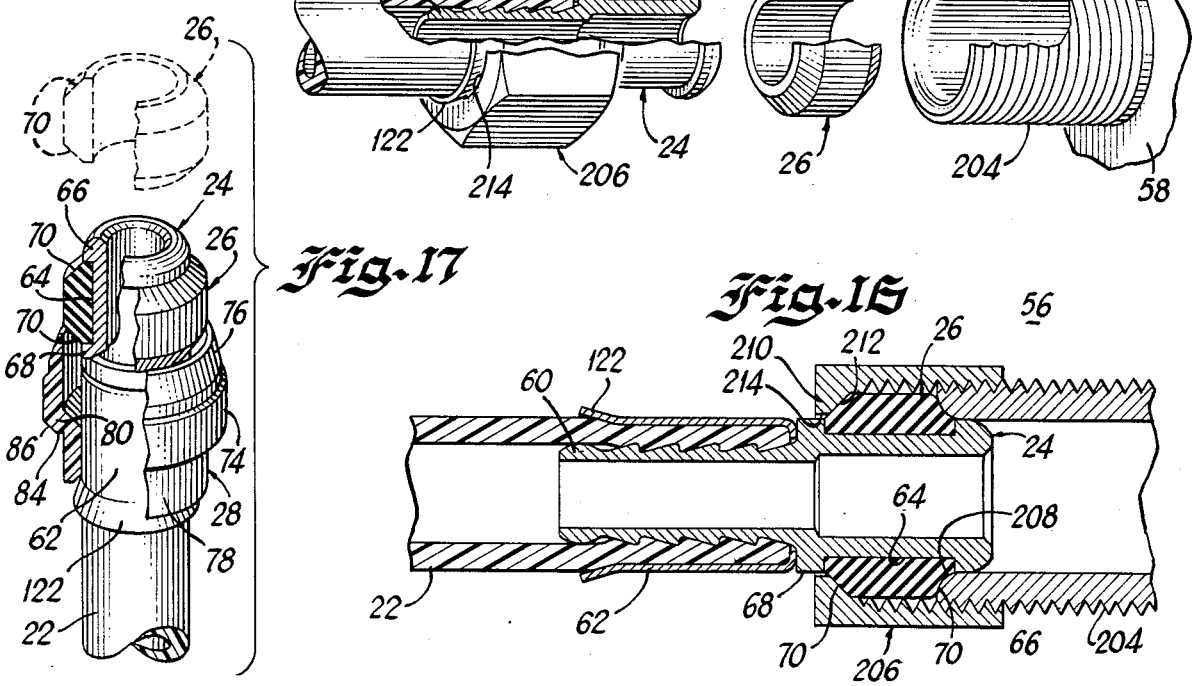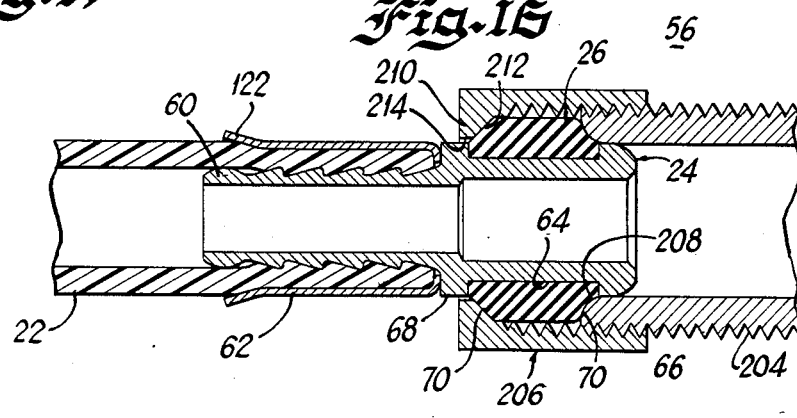

PLUMBING HOOKUP KIT

The present invention relates to an improved plumbing hookup kit having universal application to a wide variety of fitting sizes and types.

When a plumbing device such as a faucet assembly, toilet tank fill valve or ball cock, icemaker, dishwasher or other device is installed or replaced, great difficulty is frequently encountered in making the water supply hookup. A major cause of difficulty is the wide variety of fitting types and sizes to which connections must be made. The water supply connection is usually made by a length of tubing extending between a water supply source and the inlet of the device to be hooked up. The source might be a shutoff valve, pipe coupling or adaptor provided with a compression fitting or a slip fitting in any of a variety of sizes such as $\frac{3}{8}"$, 7/16" or $\frac{1}{2}"$. The task of completing the hookup is further complicated by the fact that the inlet of the device might be a faucet shank fitting, a toilet tank fill valve fitting, or some other compression or slip fitting of a given size.

In the past, it has been necessary to make the water supply hookup with a hookup device or kit in the form of a length of tubing having coupling components of specific sizes and types at each end. Thus, the installer must obtain a hookup device having a coupling at one end to match the particular size and type of water source fitting and a coupling at the other end to match the particular fitting with which the plumbing device is provided. As a result, manufacturers, distributors and retailers have been forced to provide a very large number of different hookup devices or kits for making connections between different types of fittings. For example, a hardware store may offer a dozen or two dozen different hookup devices or kits from which a purchaser must attempt to select the specific one with the proper fitting sizes and types at its ends.

The primary object of the present invention is to provide a hookup kit having a small number of components capable of effecting connections between the large variety of fitting sizes and types encountered in installing many types of plumbing devices. Other objects are to provide a hookup kit which is inexpensive and convenient to use; to provide a hookup kit providing durable and reliable fluid tight connections; to provide compression couplings including adaptor sleeves enabling tubing, terminals and seals of one size to be used with a variety of fittings of different sizes; and to overcome many difficulties encountered in the use of hookup devices and kits available in the past.

In brief, in accordance with the above and other objects of the present invention, there is provided a hookup kit for effecting a connection to any of a number of different male threaded fittings each of the type cooperating with a corresponding one of a plurality of different coupling nuts. The kit includes a length of tubing, an annular terminal at each end of the tubing, a seal ring, and a number of adaptor sleeves. The seal ring is receivable in encircling relation around the terminal and provides a fluid tight connection when used with relatively smaller fittings. When larger fittings are encountered, an adaptor sleeve is selected to complete the connection. Each adaptor sleeve has a cylindrical barrel portion receivable around the seal ring, a cylindrical shank portion having a diameter smaller than the barrel portion and sized for the aperture in the rear wall of the coupling nut associated with the fitting. A compression wall extends between the shank and barrel portions and is sandwiched in compression between the seal ring and the rear wall of the coupling nut when the coupling nut is threaded onto the fitting.

In accordance with a feature of the invention, a coupling assembly formed with the use of the adaptor sleeve includes conduit means including a terminal portion receivable through the rear wall aperture in the coupling nut in alignment with the male threaded fitting. An annular seal ring encircles the terminal between the fitting and the coupling nut rear wall. The adaptor sleeve encircles the terminal portion and includes a cylindrical barrel portion surrounding the seal ring as well as an inwardly extending compression wall portion having a forward surface engageable with the rearward end of the seal ring and having a rearward surface adapted to be contacted by the coupling nut rear wall.

The present invention together with the above and other objects and advantages thereof may be best understood from the following detailed description of the embodiment of the invention illustrated in the drawings, wherein:

FIG. 1 is a top plan view of a plumbing hookup kit embodying the invention;

FIG. 2 is a side elevational view, partly broken away, illustrating a faucet assembly and an angle shutoff valve interconnected with the hookup kit;

FIG. 3 is a side elevational view, partly broken away, illustrating a toilet tank fill valve and angle shutoff valve interconnected with the hookup kit;

FIG. 4 is a side elevational view, partly broken away, illustrating an adaptor coupling and a plumbing device or appliance interconnected with the hookup kit;

FIG. 5 is an exploded perspective view, partly in section, illustrating components of the connection to the faucet assembly of FIG. 2;

FIG. 6 is a sectional view taken along the line 6—6 of FIG. 2 and illustrating the components of FIG. 5 in assembled relation;

FIG. 7 is an exploded perspective view, partly in section, illustrating components of the connection to the angle shutoff valve of FIG. 2;

FIG. 8 is a sectional view taken along the line 8—8 of FIG. 2 and illustrating the components of FIG. 7 in assembled condition;

FIG. 9 is an exploded perspective view, partly in section, illustrating components of the connection to the toilet tank fill valve of FIG. 3;

FIG. 10 is a sectional view taken along the line 10—10 of FIG. 3 and illustrating the components of FIG. 9 in assembled condition;

FIG. 11 is an exploded perspective view, partly in section, illustrating components of the connection to the angle shutoff valve of FIG. 3;

FIG. 12 is a sectional view taken along the line 12—12 of FIG. 3 and illustrating the components of FIG. 11 in assembled condition;

FIG. 13 is an exploded perspective view, partly in section, illustrating components of the connection to the adaptor coupling of FIG. 4;

FIG. 14 is a sectional view taken along the line 14—14 of FIG. 4 and illustrating the components of FIG. 13 in assembled condition;

FIG. 15 is an exploded perspective view, partly in section, illustrating components of the connection to the appliance or device of FIG. 4;

FIG. 16 is a sectional view taken along the line 16—16 of FIG. 4 and illustrating the components of FIG. 15 in assembled condition; and FIG. 17 is a perspective view, partly in section, illustrating components of the hookup kit in a partly assembled condition.

Having reference now to the drawings, in FIG. 1 there is illustrated a plumbing hookup kit designated as a whole by the reference numeral 20 constructed in accordance with the principles of the present invention. The kit 20 includes a length of supply tubing 22 having a terminal 24 mounted at each end, a pair of seal rings 26, a pair of adaptor sleeves 28, an adaptor sleeve 30 and a pair of adaptor sleeves 32. These components are supplied in a single package or container 34 of any desired type.

Many different water supply connections can be made with the kit 20, including those illustrated by way of example in FIGS. 2–4. In FIG. 2, a connection is made between an angle shutoff valve 36 having a nominal ½" compression connection 38 and the inlet shank connection 40 of a faucet assembly 42. In FIG. 3, components of kit 20 are used to interconnect a nominal 7/16" compression connection 44 of a shutoff valve 46 with the inlet shank connection 48 of a toilet water tank fill valve 50. FIG. 4 illustrates interconnection of a nominal ⅜" slip fit connection 52 associated with a pipe adaptor coupling 54 and a nominal ⅜" compression inlet connection 56 associated with a plumbing appliance or device 58 which could be a dishwasher, icemaker, or any other device or appliance to which a water supply connection may be made.

In order to make the water supply connections illustrated in FIGS. 2–4, or any other similar water supply connection, the installer need use only the single kit 20. In the use of the kit, as will appear in more detail below, the tubing 22 with the attached terminals 24 and the seal rings 26 are employed. For certain fitting sizes and configurations, selected ones of the adaptor sleeves 28, 30 and 32 are also employed.

Proceeding now to a more detailed description of the construction and use of the components of kit 20, the tubing 22 is formed of a suitable flexible material compatible with the fluids to be conducted and capable of being bent or formed to extend between water supply sources and inlet fittings at various locations. While several materials might be used, the preferred material is an elastomer such as a dacron reinforced vinyl plastic tubing designated as Tygon inner braided tubing.

Each end of the length of tubing 22 is supplied with an identical terminal 24. Terminal 24 is formed of metal, rigid plastic, or other hard and strong material. It includes a serrated shank portion 60 received within the interior of tubing 22 and held securely in place by a swaged or crimped ferrule 62. An end portion of the terminal 24 extending beyond the end of conduit 22 includes a cylindrical recess or neck 64 defined between a pair of collars or raised portions 66 and 68 preferably having an outside diameter generally equal to the outside diameter of the ferrule 62 and the tubing 22. An axial passageway is formed throughout the length of the terminal 24 in alignment and in communication with the interior of the tubing 22.

Kit 20 includes a pair of identical seal rings 26 each adapted to be mounted upon one of the terminals 24. The rings 26 are formed of a relatively soft resilient material such as, for example, a rubber or similar material having a durometer hardness of approximately 70.

The length and the inside diameter of the seal rings 26 correspond approximately to the configuration of the recess or neck 64 so that the seal rings can be mounted in encircling relation on the terminals and held against axial movement by the spaced collars or rings 66 and 68. Each seal ring 26 includes sloped or angled end walls 70 and generally circular cylindrical inner and outer walls.

As illustrated in FIG. 2, and in more detail in FIGS. 5–8, a pair of adaptors 28 are used with the terminals 24, seal rings 26 and tubing 22 to interconnect a water source in the form of shutoff valve 36 with a fixture in the form of the faucet assembly 42. Each adaptor sleeve 28 is formed of a material stronger and more rigid than the material of the seal rings 26, yet having a degree of flexibility or deformability. A preferred material for this purpose is a low density polyethylene.

Each adaptor sleeve 28 includes a barrel portion 74 having a normal or relaxed inside diameter substantially equal to the diameter of the seal ring outer wall. The barrel portion 74 is of greater axial length than the seal ring 26, and terminates in an inwardly tapered or sloping leading wall portion 76. A generally cylindrical shank portion 78 extends rearwardly from the barrel portion 74 and includes an inside diameter approximately equal to the outside diameter of the inner collar or ring 68 of the terminal 24 and ferrule 62. A compression wall 80 extends radially or outwardly from the shank portion 78 to join the barrel portion 74 and includes a sloped or angled inner wall surface having a slope approximately equal to that of the sloped, angled end walls 70 of the seal rings 26. The outer wall surface of the compression wall 80 includes a flat, planar, annular inner portion 84 extending from the shank portion 78, and a sloped or angled outer portion 86 extending from the annular wall 84 outwardly to the outside diameter of the barrel portion 74.

As illustrated in FIG. 3 and in more detail in FIGS. 9–12, the adaptor sleeve 30 and one adaptor sleeve 32 are used together with the terminals 24, seal rings 26 and tubing 22 to interconnect a water source in the form of the shutoff valve 46 to a fixture in the form of the toilet tank fill valve 50. The adaptors 30 and 32 are preferably formed of a material the same as or similar to the material described above in connection with the adaptor sleeve 28.

Adaptor sleeve 30 includes a generally cylindrical barrel portion 88 of greater axial length than the seal rings 26 and having a tapered leading wall portion 90. The inside diameter of the barrel portion 88 is substantially equal to the diameter of the seal ring outer wall. A rearwardly extending shank portion 92 has an inside diameter substantially equal to the diameter of the terminal ring portion 68 and the ferrule 62. A compression wall 94 includes a sloped inner wall corresponding to the end wall 70 of the seal ring 26 and a flat, planar, radially extending outer wall 98 extending from the shank portion 92 to the barrel portion 88.

Adaptor 32 includes a barrel portion 100 shorter in axial length than the seal rings 26. A rearwardly extending shank portion 102 has an inside diameter corresponding to the diameter of the ferrule 62 and the terminal collar or ring 68. An angled and sloped compression wall 104 extends outwardly from the shank portion 102 to the barrel portion 100, and is angled or sloped in a manner equivalent to the end wall 70 of the seal rings 26.

FIG. 2 illustrates a typical faucet installation wherein a water supply hookup is made with components of the kit 20. The shutoff valve 36 communicates with a water supply pipe 106 extending through a wall 108. Located above the shutoff valve 36 is a sink deck 110 upon which the faucet assembly 42 is mounted by means of a mounting nut 111.

The connection of the tubing 22 to the faucet inlet shank connection 40 is illustrated in detail in FIGS. 5 and 6. The faucet shank connection 40 includes a conventional male threaded shank fitting 112, with ½" straight pipe threads. A coupling nut 114 mates with the shank 112. The coupling 40 is normally a ½" slip fit coupling and the fitting 112 includes a beveled or sloped inner opening wall 116, while the rear wall 118 of the coupling nut 114 includes a flat, planar, radial inner surface. Rear wall 118 includes a central axial opening 120 sized to receive nominal ¼" tubing or conduit.

In connecting tubing 22 to the connection 40, the coupling nut 114 is placed over the terminal 24 and end of the tubing 22 (FIG. 5). The adaptor sleeve 28 is also placed over the terminal 24. The ferrule 62 includes an enlarged inner skirt portion 122 preventing the adaptor sleeve 28 from moving an excessive distance over the tubing 22.

After positioning of the coupling nut 114 and adaptor sleeve 28 on the tubing 22 and terminal 24, the seal ring 26 is snapped into place in the recess or neck 64 of the terminal. At this time, the coupling nut and adaptor sleeve are pushed forward so that the seal ring 26 is slidably received within the barrel portion 74 of the adaptor sleeve 28. The coupling nut 114 is then threaded onto the male threaded shank 112 in order to complete the connection.

As the coupling nut 114 is tightened, and as illustrated in FIG. 6, the tapered leading wall portion 76 of the adaptor 28 engages the beveled, sloped inner wall 116 of the threaded shank 112. Consequently, the leading portion of the adaptor barrel 74 is compressed radially inwardly to provide a tight seal between the barrel portion 74 and the seal ring 26 and also to provide a tight seal between the barrel portion 74 and the wall 116 of the shank 112. During tightening, the rear wall 118 of the coupling nut 114 engages the flat, annular back wall 84 of the adaptor 28 to force it forwardly toward the seal ring 26 and the threaded shank 112.

Connection of the tubing 22 to the ½" compression connection 38 of the shutoff valve 36 is shown in detail in FIGS. 7 and 8. The connection 38 includes a male threaded valve outlet fitting 126 cooperating with a coupling nut 128 having a rear wall 130 provided with a central aperture 132 for accommodating nominal ¼" tubing or conduit. The compression coupling of FIGS. 7 and 8 differs from the slip fit type coupling of FIGS. 5 and 6 in that the fitting 126 has a rounded inner wall portion 134, and the coupling nut 128 includes a beveled or sloped inner wall 136.

In order to make a connection to the shutoff valve connection 38, the coupling nut 128 and adaptor sleeve 28 are mounted upon the terminal 24 and tubing 22 (FIG. 7). The seal ring 26 is then mounted on the terminal 24, and the coupling nut and adaptor are moved forward so that the seal ring is slidably received within the barrel portion 74 of the adaptor 28. When the coupling nut 128 is tightened upon the male threaded fitting 126, the beveled inner wall 136 engages the sloped, angled outer portion 86 of the compression wall 80 of the adaptor sleeve 28 to force the adaptor sleeve 28 in a forward direction toward the seal ring 26 and the threaded fitting 126. Consequently, the tapered leading wall portion 76 of the adaptor sleeve 28 engages the rounded wall 134 of the fitting 126 so that the forward portion of the adaptor barrel portion 74 is deformed or compressed in a radially inward direction. Consequently, the barrel portion 88 forms a fluid tight seal against the rounded wall 134 and also against the seal ring 26.

In view of the above, it can be seen that the adaptor sleeve 28 can be used with either a slip type connection such as the connection 40 or a compression type connection such as the connection 38. This is possible because the configuration of the tapered leading wall portion 76 is such as to be compressed by and to sealingly engage either the beveled, sloped inner wall 116 of the faucet shank 112 or the rounded wall 134 of the fitting 126. Moreover, the configuration of the rearwardly facing surfaces of the compression wall 80 are such as to be compressibly engaged by either the radial rear wall 118 of the coupling nut 114 or the beveled inner wall 136 of the coupling nut 128.

FIG. 3 illustrates one typical water supply connection for a toilet water tank 140. The shutoff valve 46 is connected to a water supply pipe 142 extending upwardly through floor 144. The toilet tank fill valve 50 in the form of a ball cock or other fill valve is mounted to the tank floor wall by means of a mounting nut 146.

The interconnection of tubing 22 to the inlet shank connection 48 of the fill valve 50 is illustrated in detail in FIGS. 9 and 10. The shank connection 48 includes a male threaded shank fitting 150 cooperating with a coupling nut 152. The shank 150 has a rounded inner leading edge wall 154. Coupling nut 152 includes a rear wall 156 with a central aperture 158. The inner wall surface of the rear wall 156 is flat, planar and extends radially. As is typical, the fill valve shank fitting 150 is larger than the faucet shank fitting 112 and, for example, includes 15/16"×14 threads. Normally, supply connections to fill valve inlet shanks are made with compression type couplings or ground-joint couplings.

In order to interconnect tubing 22 to the fill valve 50, the coupling nut 152 and the adaptor 30 are placed over the terminal 24 at the end of the tubing 22 (FIG. 9). The shank portion 92 of the adaptor 30 includes a beveled inner wall portion 160 receiving the skirt 122 of the ferrule 62 to provide clearance for mounting of the seal ring 26 in the terminal recess or neck 64. The coupling nut 152 and adaptor sleeve 30 are moved forwardly so that the seal ring 26 is slidably received within the barrel portion 88 of adaptor 30.

As the coupling nut 152 is threaded onto the fitting 150, coupling nut rear wall 156 engages the annular outer wall 98 of the compression wall 94 of the adaptor 30. The adaptor 30 is forced in a forward direction toward the seal ring 26 and the fitting 150. Consequently, the tapered leading wall portion 90 engages the rounded wall 154 to force the forward portion of the adaptor barrel 88 radially inwardly. A fluid tight seal is created between the barrel portion 88 and the rounded wall 154 and also between the barrel portion 88 and the seal ring 26.

The interconnection between the tubing 22 and the shutoff valve 46 is illustrated in detail in FIGS. 11 and 12. The nominal 7/16" compression connection associated with the outlet of the valve 46 includes a threaded male fitting 170 cooperating with a coupling nut 172. Fitting 170 includes a rounded inner wall portion 174, while the rear wall 176 of the coupling nut 172 includes an angled or beveled inner wall surface 178. An aperture 180 in the coupling nut rear wall 176 is sized to receive nominal 7/16" tubing or conduit.

In order to hook up the tubing 22 to the fitting 170, the coupling nut 172 and the adaptor sleeve 32 are placed over the terminal 24 and the end of the tubing 22 (FIG. 11). The ferrule skirt 122 restricts movement of the adaptor sleeve 32 over the tubing 22. Seal ring 26 is mounted on the terminal 24, and the coupling nut 172 and adaptor sleeve 34 are moved forwardly so that the seal ring 26 is received within the barrel portion 100 of the adaptor 32.

When the coupling nut 172 is threaded onto the fitting 170, the angled or beveled inner wall 178 of the coupling nut rear wall 176 is forced forwardly into engagement with one of the end walls 70 of the seal ring 26. As a result, the other end wall 70 is forced into tight sealing engagement with the rounded wall 174 of the threaded male fitting 170. The barrel portion 100 of the adaptor sleeve 32 radially contains and reinforces the seal ring 26 assuring a firm seal, while the compression wall 104 and barrel portion 100 prevent outward or rearward extrusion of the seal ring.

FIG. 4 illustrates a typical water supply connection to a dishwasher, icemaker or other appliance or device 58. A water supply pipe 184 extends to the region of the device or appliance 58 and is connected to the pipe adaptor coupling 54 having a $\frac{3}{8}$" slip fit connection 52.

The connection to the pipe adaptor coupling 54 is illustrated in detail in FIGS. 13 and 14. The coupling includes a male threaded fitting 190 cooperating with a coupling nut 192. Fitting 190 includes an angled or tapered inner leading wall 194. Coupling nut 192 includes a rear wall 196 having a flat, planar, annular inner wall surface and having an aperture 200 sized to receive $\frac{3}{8}$" tubing or conduit.

In making the connection illustrated in FIG. 14, the coupling nut 192 is first placed over the terminal 24 and end of the tubing 22, and then the seal ring 26 is placed in the terminal recess or neck 64 (FIG. 13). When the coupling nut 192 is threaded onto the fitting 190, the rear wall 196 of the coupling nut compresses the seal ring 26 into tight sealing engagement with the forward end of the fitting 190 and the angled or tapered wall 194.

The connection to the device or appliance 58 is illustrated in detail in FIGS. 15 and 16. The $\frac{3}{8}$" compression coupling 56 includes a male threaded shank or fitting 204 cooperating with a coupling nut 206. Fitting 204 includes a rounded inner end wall 208. The coupling nut 206 includes a rear wall 210 having a beveled inner wall surface 212 and an aperture 214 sized to receive nominal $\frac{3}{8}$" tubing or conduit.

In making the connection illustrated in FIG. 16, the coupling nut 206 and then the seal ring 26 are mounted over the terminal 24 and tubing 22. When the coupling nut is tightened onto the fitting 204, the beveled surface 214 of the rear wall 210 engages the seal ring 26 and forces it into tight sealing engagement with the rounded inner end wall 208.

The slip fit connection and the compression connection illustrated respectively in FIGS. 14 and 16 differ in the configuration of the inner end wall of the fittings 190 and 204 and in the configuration of the coupling nut rear walls 196 and 210. Yet, the seal ring 26 in cooperation with the terminal 24 acts to provide a reliable fluid tight seal in either type of connection.

One important advantage of the hook up kit 20 is that the components of the kit are capable of producing connections to many different types and sizes of fittings including those illustrated in the drawings and others. By selection of the proper one of adapters 28, 30 and 32, where required, connections can be made to fittings in nominal sizes of $\frac{3}{8}$", 7/16", $\frac{1}{2}$" and larger, and connections can be made to various types of commonly used fittings including slip fittings, groundjoint fittings wherein a conical pipe end is intended to fit into a tapered male threaded fitting, metal ring compression joint fittings, rubber ring compression joint fittings, and a so-called "Speedee" fitting wherein a pre-formed ball-shaped tubing end is intended to fit into a similarly formed inner wall portion in a male threaded fitting or shank.

A further advantage of the plumbing hook up kit 20 is the ease with which the necessity for use of an adapter sleeve and selection of the proper adapter sleeve can be accomplished by the user. In this respect, it should be noted that the adapter sleeves are not specific to any one particular type of fitting such as a compression fitting or a slip fitting. Consequently, selection of a proper size of adapter sleeve is all that is necessary.

In accordance with a feature of the invention, selection of the proper adapter sleeve size is facilitated by the relationship of the adapter sleeve shank to the apertured rear wall in the coupling nut. For example, the outside diameter of the adapter sleeve shank portions 78 and 92 of the adapters 28 and 30 are too large to fit within the rear wall aperture of a $\frac{3}{8}$" or 7/16" coupling nut. As a result, the installer is unable to attempt to use an adapter sleeve in a connection where none is required. Similarly, the outside diameter of shank portion 78 of adapter sleeve 28 is larger than the aperture in a 7/16" coupling nut and the installer is unable to use a sleeve 28 in a connection requiring a sleeve 32. Moreover, the outside diameter of the barrel portion 88 of the adapter sleeve 30 is too large to be received into the interior of $\frac{1}{2}$" or smaller coupling nuts.

Because of this relation between sleeve shank sizes and coupling nut aperture sizes, the user of the kit can select the proper adapter sleeve simply by using the largest adapter sleeve which fits within the coupling nut of the connection to which a hook up is to be made. No special skill is required either in selecting a particlar hookup kit or device nor in selecting the proper components of the hookup kit 20 for making any particular water supply connection.

While the invention has been described with reference to details of the illustrated embodiment, such details are not intended to limit the invention as defined in the following claims.

What is claimed and desired to be secured by Letters Patent of the United States is:

1. A plumbing hookup kit for connecting one of a plurality of different water supply connections to one of a plurality of different water fixture connections, the different supply and fixture connections including male threaded fittings of different sizes and types and mating threaded coupling nuts of different sizes and types, the coupling nuts each including an apertured wall, said hookup kit comprising:

a length of flexible tubing;

a pair of generally cylindrical terminals, means for attaching one of said pair of terminals to each end of said tubing;

a pair of flexible resilient sealing rings each engageable in encircling relation around one of said terminals each sealing ring including a generally cylindrical outer wall, each said sealing ring including at least one sloped end wall; said end wall sloped relative to said outer wall, and a plurality of different adaptor sleeves each having an inside configuration corresponding to said terminal and seal ring and an outside configuration permitting it to be received in at least one size coupling nut, said inside configuration including a portion complementary to and adapted to engage said sloped end wall of said sealing ring, whereby upon connecting a water supply connection to a water fixture connection each said sealing ring sealingly encircles each said terminal, each said adaptor sleeve encircles said sealing rings and sealingly engages said water fixture connection, each said coupling nut mates with said water fixture connection and encircles an adaptor sleeve maintaining said adaptor sleeve in engagement with said sealing ring and said said water fixture connetion to provide a leak proof connection.

2. The plumbing hookup kit of claim 1, including at least two identical adaptor sleeves.

3. The plumbing hookup kit of claim 1 wherein said terminals include an annular recess bounded by a pair of raised collar portions for retaining said seal ring on said terminal.

4. The plumbing hookup kit of claim 1, each adaptor sleeve including a barrel portion having a first portion with an inner configuration slidably receiving said seal ring, and outer configuration slidably receivable within at least one size coupling nut, and a radially inwardly extending compression wall adapted to be sandwiched between said coupling nut apertured wall and an axial end of said seal ring.

5. The plumbing hookup kit of claim 4, each adaptor sleeve further including a cylindrical shank portion extending from said barrel portion adapted to extend through a coupling nut apertured wall.

6. The plumbing hookup kit of claim 5, the shank portions of different adaptor sleeves having different outside diameters corresponding in size to the diameters of the apertures in said apertured walls of different coupling nuts.

7. The plumbing hookup kit of claim 5, further comprising stop means defined around said tubing adjacent each terminal, said shank portions being engageable with said stop means for restricting movement of said adaptor sleeves an excessive distance along said tubing.

8. The plumbing hookup kit of claim 1, further comprising a single package containing said tubing, terminals, seal rings and adaptor sleeves.

9. The plumbing hookup kit of claim 1, said tubing being formed of flexible elastomeric material.

10. A plumbing hookup kit for effecting a connection to one of a plurality of different male threaded fittings each of the type cooperating with a corresponding one of a plurality of different threaded coupling nuts having apertured walls, said kit comprising:
  a length of tubing;
  an annular terminal; means for securing said annular terminal to an end of said tubing, said terminal having a maximum outside diameter smaller than the aperture in said apertured wall of any of the different coupling nuts;
  a seal ring receivable in encircling relation around said terminal; and
  at least one adaptor sleeve having a cylindrical barrel portion receivable around said seal ring, a cylindrical shank portion having a diameter smaller than said barrel portion and larger than said aperture in said apertured wall of at least some of the different coupling nuts, and a compression wall extending between the shank and barrel portions and of a size allowing said compression wall to be sandwiched between said seal ring and a coupling nut wall when the coupling nut is threaded onto the fitting, whereby upon connection to the male threaded fitting said seal ring sealingly engages said male threaded fitting and sealingly engages and encircles said terminal, said adaptor sleeve encircles said seal ring, and said coupling nut encircles and engages said adaptor sleeve to provide a fluid tight hook up.

11. A plumbing hookup kit as claimed in claim 10 further comprising a pair of said adaptor sleeves having shank portions of different sizes.

12. A coupling assembly for use with a male threaded plumbing fitting and a female threaded coupling nut cooperating with the fitting, the coupling nut having a centrally apertured wall, said coupling assembly comprising:
  conduit means including a terminal portion receivable through the coupling nut apertured wall in alignment with the fitting;
  an annular seal ring encircling said terminal portion between the fitting and the coupling nut apertured wall; said terminal portion including means for holding said seal ring, and
  an annular adaptor sleeve encircling said terminal portion;
  said sleeve including a cylindrical barrel portion surrounding said seal ring and of a configuration to engage and be compressed by said fitting upon coupling said fitting and said nut, and
  an inwardly extending compression wall portion having a first surface engageable with an end of said seal ring and having a second surface adapted to be contacted by the coupling nut apertured wall, whereby upon connection to the male threaded fitting said seal ring sealingly engages and encircles said terminal, said adaptor sleeve encircles said seal ring, and one of said adaptor sleeve and said seal ring sealingly engages said male threaded fitting and said coupling nut encircles and engages said adaptor sleeve to provide a fluid tight hook up.

13. The coupling assembly of claim 12, said sleeve barrel portion extending for at least substantially the axial length of said seal ring and adapted to contact the fitting.

14. The coupling assembly of claim 12, said sleeve barrel portion extending for a distance less than the axial length of said seal ring, said seal ring being adapted to contact said fitting.

15. The coupling assembly of claim 12, said sleeve further including a cylindrical shank portion extending from said compression wall portion and slidably receivable in the aperture of coupling nut said apertured wall.

16. The coupling assembly of claim 15, the second directed surface of said compression wall including a flat, radial, planar portion extending radially from said shank portion, and an inclined portion extending between said planar portion and said barrel portion.

17. The coupling assembly of claim 12, the axial ends of said seal ring being tapered, and the inner surface of said compression wall being similarly tapered.

* * * * *